United States Patent
Park et al.

(10) Patent No.: US 9,758,669 B2
(45) Date of Patent: Sep. 12, 2017

(54) THERMOPLASTIC RESIN COMPOSITION

(71) Applicant: Samsung SDI Co., Ltd., Yongin-si (KR)

(72) Inventors: Jung Eun Park, Uiwang-si (KR); Keehae Kwon, Uiwang-si (KR); Chang Min Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 14/824,354

(22) Filed: Aug. 12, 2015

(65) Prior Publication Data
US 2016/0046805 A1  Feb. 18, 2016

(30) Foreign Application Priority Data

Aug. 18, 2014  (KR) .................. 10-2014-0106854
Aug. 10, 2015  (KR) .................. 10-2015-0112489

(51) Int. Cl.
*C08L 69/00*  (2006.01)

(52) U.S. Cl.
CPC ......... *C08L 69/00* (2013.01); *C08L 2205/035* (2013.01); *C08L 2207/04* (2013.01); *C08L 2207/53* (2013.01)

(58) Field of Classification Search
CPC ...................................... C08L 69/00
USPC ........................................ 524/451
See application file for complete search history.

(56) References Cited

U.S. PATENT DOCUMENTS

| | | | | |
|---|---|---|---|---|
| 5,106,907 A | * | 4/1992 | Boutni | C08L 69/00 525/133 |
| 8,557,912 B2 | * | 10/2013 | Chung | C08L 25/12 524/504 |
| 2010/0267882 A1 | * | 10/2010 | Clunk | C08J 3/226 524/445 |
| 2011/0229704 A1 | * | 9/2011 | Grcev | C08J 5/18 428/220 |
| 2012/0065318 A1 | * | 3/2012 | Park | C08L 69/00 524/508 |
| 2012/0172515 A1 | * | 7/2012 | Cho | C08L 51/04 524/502 |

FOREIGN PATENT DOCUMENTS

KR  10-1035116 B1  5/2011

* cited by examiner

*Primary Examiner* — Doris Lee
(74) *Attorney, Agent, or Firm* — Additon, Higgins & Pendleton, P.A.

(57) ABSTRACT

A thermoplastic resin composition includes a base resin including (A1) polycarbonate resin, (A2) polyester resin, and (A3) a vinyl cyanide compound-aromatic vinyl compound copolymer; (B) an impact reinforcing agent; and (C) a filler, wherein the (B) impact reinforcing agent has a core-shell structure including a rubbery polymer selected from the group consisting of a diene rubber, an acrylic rubber, a silicone rubber, and combinations thereof. A molded part for an automobile exterior can be made using the thermoplastic resin composition.

16 Claims, No Drawings

THERMOPLASTIC RESIN COMPOSITION

CROSS-REFERENCE TO RELATED APPLICATION

This application claims the benefit of priority under 35 U.S.C. §119(a) of Korean Patent Application No. 10-2014-0106854, filed on Aug. 18, 2014, and Korean Patent Application No. 10-2015-0112489, filed on Aug. 10, 2015, in the Korean Intellectual Property Office, the entire disclosure of each of which is incorporated herein by reference for all purposes.

FIELD

The present invention relates to a thermoplastic resin composition and a molded part for an automobile exterior component made using the same.

BACKGROUND

In accordance with recent trends toward increased lightness of automobiles, demand for thermoplastic resins providing superior rigidity for automobile exterior components such as body panels, spoilers and the like has significantly increased. A large amount of filler can be added to a resin in order to impart a high degree of rigidity, improvements in rigidity, dimensional stability and heat resistance to the thermoplastic resin. Impact resistance, however, may be remarkably degraded and also the exterior appearance of an injection-molded product can deteriorate due to filler particles being not dispersed.

A linear acrylic impact reinforcing agent can be added to a thermoplastic resin to improve impact resistance of, for example, a polycarbonate resin. A linear acrylic impact reinforcing agent may improve impact resistance properties but can also cause delamination in an injection-molded product due to a reduction in compatibility between the polycarbonate resin and the acrylic impact reinforcing agent. Further, halo patterns may be formed in a surface of the injection-molded product.

Glass fiber can also be used to provide a resin having high degrees of rigidity and dimensional stability. The glass fiber, however, can significantly deteriorate the exterior appearance of an injection-molded product due to protrusion of glass fiber. Wollastonite or barium sulfate ($BaSO_4$) can be used as filler to provide an injection-molded part with excellent exterior appearance. The injection-molded part, however, may not have sufficient dimensional stability and rigidity.

SUMMARY

Exemplary embodiments of the present invention can provide a thermoplastic resin composition that can have superior rigidity and/or dimensional stability and can allow for an excellent exterior appearance of an injection-molded part, and a molded part for an automobile exterior component made using the same.

According to an exemplary embodiment of the present invention, there is provided a thermoplastic resin composition including: a base resin including (A1) polycarbonate resin, (A2) polyester resin, and (A3) a vinyl cyanide compound-aromatic vinyl compound copolymer; (B) an impact reinforcing agent; and (C) a filler, wherein the (B) impact reinforcing agent has a core-shell structure including a rubbery polymer selected from the group consisting of diene rubbers, acrylic rubbers, silicone rubbers, and combinations thereof.

The thermoplastic resin composition may further include (D) a polyolefin wax, and the (D) polyolefin wax may be a polyethylene wax.

The (A3) vinyl cyanide compound-aromatic vinyl compound copolymer may be copolymerized from the monomer mixture including about 1 to about 30 wt % of a vinyl cyanide compound.

The (B) impact reinforcing agent may be included in an amount of about 3 to about 15 parts by weight with respect to about 100 parts by weight of the base resin, and an average particle size of the (B) impact reinforcing agent may be about 100 to about 400 nm.

The core of the (B) impact reinforcing agent may include a rubbery polymer comprising a diene rubber, an acrylic rubber, a silicone rubber, or a combination thereof, and the shell of the (B) impact reinforcing agent may include styrene, alkyl-substituted styrene, (meth)acrylonitrile, (meth)acrylate, alkyl(meth)acrylate, or a combination thereof as a monomer which is capable of being graft-copolymerized onto the rubbery polymer. In this case, the term 'alkyl' refers to C1 to C10 alkyl.

The weight ratio of the core to the shell in the (B) impact reinforcing agent may be about 2:8 to about 8:2.

The (D) polyolefin wax may be included in an amount of about 0.1 to about 1 part by weight with respect to about 100 parts by weight of the base resin.

The (C) filler may be included in an amount of about 10 to about 40 parts by weight with respect to about 100 parts by weight of the base resin.

The (C) filler may be talc particles, and the talc particles may have a plate-like shape and an aspect ratio of about 4 to about 50.

The (A2) polyester resin may be a polyethylene terephthalate resin.

The base resin may include about 50 to about 85 wt % of the (A1) polycarbonate resin, about 10 to about 45 wt % of the (A2) polyester resin, and about 1 to about 8 wt % of the (A3) vinyl cyanide compound-aromatic vinyl compound copolymer.

According to another exemplary embodiment of the present invention, there is provided a molded part for an automobile exterior component, prepared using the thermoplastic resin composition for use in an automobile.

The molded part for an automobile exterior component may have an Izod impact strength of about 7 to about 10 kgf·cm/cm measured by ASTM D256, a flexural modulus of about 40,000 $kgf/cm^2$ or more measured by ASTM D790 and a coefficient of thermal expansion ranging from about 40 to about 45 μm/(m·° C.) measured by ASTM E831.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

Exemplary embodiments of the present invention relate to a thermoplastic resin composition and may provide a thermoplastic resin composition capable of being used in a molded part for an automobile exterior component.

First, a base resin of the thermoplastic resin composition according to an exemplary embodiment of the present invention may include (A1) polycarbonate resin, (A2) polyester resin, and (A3) a vinyl cyanide compound-aromatic vinyl compound copolymer.

(A1) Polycarbonate Resin

The (A1) polycarbonate resin according to an exemplary embodiment of the present invention may be prepared through a reaction between a diphenol represented by the following Chemical Formula 1 and a compound selected from the group consisting of phosgene, halogen acid ester, carbonate ester and combinations thereof.

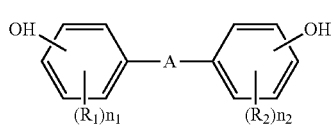

[Chemical Formula 1]

wherein A is a single bond, a substituted or unsubstituted linear or branched chain C1 to C30 alkylene group, a substituted or unsubstituted C2 to C5 alkenylene group, a substituted or unsubstituted C2 to C5 alkylidene group, a substituted or unsubstituted linear or branched chain C1 to C30 haloalkylene group, a substituted or unsubstituted C5 to C6 cycloalkylene group, a substituted or unsubstituted C5 to C6 cycloalkenylene group, a substituted or unsubstituted C5 to C10 cycloalkylidene group, a substituted or unsubstituted C6 to C30 arylene group, a substituted or unsubstituted linear or branched chain C1 to C20 alkoxylene group, a halogen acid ester group, a carbonate ester group, CO, S or $SO_2$, $R_1$ and $R_2$ are the same or different and each independently represent a substituted or unsubstituted C1 to C30 alkyl group or a substituted or unsubstituted C6 to C30 aryl group, and $n_1$ and $n_2$ are the same or different and each independently represent an integer of 0 to 4. As used herein, the term "substituted" means that a hydrogen atom is substituted with a substituent selected from the group consisting of a halogen group, a C1 to C30 alkyl group, a C1 to C30 haloalkyl group, a C6 to C30 aryl group, a C1 to C2 alkoxy group and combinations thereof.

Two or more diphenols represented by Chemical Formula 1 may be combined to form a repeating unit of the polycarbonate resin. Examples of such a diphenol may include without limitation 4,4'-dihydroxydiphenyl, 2,2-bis(4-hydroxyphenyl)propane (also called 'bisphenol-A'), 2,4-bis(4-hydroxyphenyl)-2-methylbuthane, bis(4-hydroxyphenyl)methane, 1,1-bis(4-hydroxyphenyl)cyclohexane, 2,2-bis(3-chloro-4-hydroxyphenyl)propane, 2,2-bis(3-methyl-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis(4-hydroxyphenyl)ether and the like, and combinations thereof. In exemplary embodiments, 2,2-bis(4-hydroxyphenyl)propane, 2,2-bis(3-methyl-4-hydroxyphenyl)propane, 2,2-bis(3,5-dimethyl-4-hydroxyphenyl)propane, 2,2-bis(3,5-dichloro-4-hydroxyphenyl)propane and/or 1,1-bis(4-hydroxyphenyl)cyclohexane may be used, for example, 2,2-bis(4-hydroxyphenyl)propane may be used.

The (A1) polycarbonate resin used herein may have, but is not limited to, a weight-average molecular weight measured by Gel Permeation Chromatography (GPC) using polystyrene as a standard sample of about 10,000 to about 200,000 g/mol, for example, about 10,000 to about 50,000 g/mol. In the case that the weight-average molecular weight of the (A1) polycarbonate resin is within the above range, high degrees of impact resistance and/or flowability may be obtained. In addition, in order to satisfy a desired level of flowability, two or more types of polycarbonate resins having different weight-average molecular weights from each other may be mixed to be used.

The (A1) polycarbonate resin may include a copolymer or a mixture of (co)polymers prepared using two or more diphenols. Further, the (A1) polycarbonate resin may include a linear polycarbonate resin, a branched polycarbonate resin, and/or a polyester-carbonate copolymer resin.

The linear polycarbonate resin may be a bisphenol-A type polycarbonate resin or the like. The branched polycarbonate resin may be prepared by reacting a polyfunctional aromatic compound such as trimellitic acid anhydride or trimellitic acid with a diphenol and carbonate. The polyfunctional aromatic compound may be included in an amount of about 0.05 to about 2 mol % with respect to a total amount of the branched polycarbonate resin. The polyester-carbonate copolymer resin may be prepared by reacting a di-functional carboxylic acid with a diphenol and carbonate. The carbonate may be diarylcarbonate such as diphenylcarbonate, ethylene carbonate, or the like.

(A2) Polyester Resin

The (A2) polyester resin according to an exemplary embodiment of the present invention may be an aromatic polyester resin. The polyester resin may be a resin prepared through polycondensation of a component derived from terephthalic acid and/or terephthalic acid alkyl ester and a glycol component having 2 to 10 carbon atoms. As used herein, the term "alkyl" refers to C1 to C10 alkyl.

Examples of the aromatic polyester resin may include without limitation a polyethylene terephthalate resin, a polytrimethylene terephthalate resin, a polybutylene terephthalate resin, a polyhexamethylene terephthalate resin, a polycyclohexane dimethylene terephthalate resin, an amorphous modified polyester resin thereof formed by adding another monomer to the resins, and the like, and combinations thereof. In exemplary embodiments, a polyethylene terephthalate resin, a polytrimethylene terephthalate resin, a polybutylene terephthalate resin and/or an amorphous polyethylene terephthalate resin may be used, for example, a polyethylene terephthalate resin may be used.

The polyethylene terephthalate resin may be a linear resin prepared through polycondensation of terephthalic acid and ethylene glycol, and examples thereof may include a polyethylene terephthalate homopolymer and/or a polyethyleneterephthalate copolymer.

The polyethylene-terephthalate copolymer may be an amorphous polyethylene terephthalate copolymer including 1,4-cyclohexane dimethanol (CHDM) as a copolymerization component, and/or may be a copolymer in which a portion of an ethylene glycol component is substituted with 1,4-cyclohexane dimethanol (CHDM).

The polyethylene terephthalate resin may have an intrinsic viscosity [η] measured in an o-chlorophenol solvent at 25° C. of about 0.6 to about 1 dl/g, for example, about 0.7 to about 0.9 dl/g. In a case in which an intrinsic viscosity of the polyethylene terephthalate resin is in the above range, mechanical strength and moldability may be excellent.

(A3) Vinyl Cyanide Compound-Aromatic Vinyl Compound Copolymer

The (A3) vinyl cyanide compound-aromatic vinyl compound copolymer may have a weight-average molecular weight measured by Gel Permeation Chromatography (GPC) using polystyrene as a standard sample of about 70,000 to about 400,000 g/mol, for example, about 100,000 to about 200,000 g/mol.

Examples of the vinyl cyanide compound may include without limitation acrylonitrile, methacrylonitrile, fumaronitrile, and the like, and combinations thereof.

Examples of the aromatic vinyl compound may include without limitation styrene, a-methylstyrene, halogen and/or C1-C10 alkyl-substituted styrene, and the like, and combinations thereof.

The (A3) vinyl cyanide compound-aromatic vinyl compound copolymer may optionally include one or more other compounds which are capable of being copolymerized with aromatic vinyl compound as co-monomers. Examples of the other compounds may include without limitation methacrylic acid alkyl esters, acrylic acid alkyl esters, maleic anhydride, alkyl and/or phenyl nucleus-substituted maleimides, and the like, and combinations thereof. In this case, the term 'alkyl' refers to C1 to C8 alkyl.

The (A3) vinyl cyanide compound-aromatic vinyl compound copolymer may be copolymerized using a mixture including the vinyl cyanide compound in an amount of about 1 to about 30 wt % (weight percent), for example, about 1 to about 25 wt %, and as another example about 10 to about 25 wt %. In some embodiments, the (A3) vinyl cyanide compound-aromatic vinyl compound copolymer may include the vinyl cyanide compound in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the amount of the vinyl cyanide compound can be in a range from about any of the foregoing amounts to about any other of the foregoing amounts.

When the vinyl cyanide compound is used in an amount within this range, a stable phase distribution of polyester resin within the thermoplastic resin composition may be enabled to thereby enhance impact resistance properties as well as significantly improving exterior characteristics.

The (A3) vinyl cyanide compound-aromatic vinyl compound copolymer according to an exemplary embodiment of the present invention may be a styrene-acrylonitrile copolymer.

The base resin may include about 50 to about 85 wt % of the (A1) polycarbonate resin, about 10 to about 45 wt % of the (A2) polyester resin, and about 1 to about 8 wt % of the (A3) vinyl cyanide compound-aromatic vinyl compound copolymer. In exemplary embodiments, the base resin may include about 60 to about 85 wt % of the (A1) polycarbonate resin, about 10 to about 35 wt % of the (A2) polyester resin, and about 2 to about 6 wt % of the (A3) vinyl cyanide compound-aromatic vinyl compound copolymer.

In some embodiments, the base resin may include the (A1) polycarbonate resin in an amount of about 50, 51, 52, 53, 54, 55, 56, 57, 58, 59, 60, 61, 62, 63, 64, 65, 66, 67, 68, 69, 70, 71, 72, 73, 74 75, 76, 77, 78, 79, 80, 81, 82, 83, 84, or 85 wt %. Further, according to some embodiments of the present invention, the amount of the (A1) polycarbonate resin can be in a range from about any of the foregoing amounts to about any other of the foregoing amounts.

In some embodiments, the base resin may include the (A2) polyester resin in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45 wt %. Further, according to some embodiments of the present invention, the amount of the (A2) polyester resin can be in a range from about any of the foregoing amounts to about any other of the foregoing amounts.

In some embodiments, the base resin may include the (A3) vinyl cyanide compound-aromatic vinyl compound copolymer in an amount of about 1, 2, 3, 4, 5, 6, 7, or 8 wt %. Further, according to some embodiments of the present invention, the amount of the (A3) vinyl cyanide compound-aromatic vinyl compound copolymer can be in a range from about any of the foregoing amounts to about any other of the foregoing amounts.

In the case that amounts of the components are outside of the above ranges, it may be unfeasible to implement a thermoplastic resin composition having a high degree of rigidity and excellent exterior characteristics through the mixture of an (B) impact reinforcing agent and a (C) filler. In a case in which amounts of the components are within the above ranges, impact resistance and/or heat resistance properties may be improved.

(B) Impact Reinforcing Agent

The thermoplastic resin composition according to an exemplary embodiment of the present invention may include the (B) impact reinforcing agent. The (B) impact reinforcing agent may have a core-shell structure including a rubbery polymer selected from the group consisting of a diene rubber, an acrylic rubber, a silicone rubber, and combinations thereof.

Here, the (B) impact reinforcing agent, a rubbery polymer-modified graft copolymer, may be prepared by, after forming a rubbery polymer as a core component selected from the group consisting of a diene rubber, an acrylic rubber, a silicone rubber and combinations thereof, performing a graft copolymerization of a monomer which is capable of being graft-copolymerized onto the rubbery polymer to form a shell component. The monomer may be selected from the group consisting of styrene, alkyl-substituted styrene, (meth)acrylonitrile, (meth)acrylate, alkyl(meth)acrylate, and combinations thereof. In this case, the term 'alkyl' refers to C1 to C10 alkyl.

The diene rubber may be polymerized using butadiene, isoprene, and the like, and combinations thereof, for example, butadiene.

The acrylic rubber may be polymerized using methyl acrylate, ethyl acrylate, n-propyl acrylate, n-butyl acrylate, 2-ethylhexyl acrylate, hexyl methacrylate, 2-ethylhexyl methacrylate and the like, and combinations thereof.

The silicone rubber may be prepared using cyclosiloxane. Examples of the cyclosiloxane can include without limitation hexamethyl-cyclotrisiloxane, octamethylcyclotetrasiloxane, decamethylcyclopentasiloxane, dodecamethyl-cyclohexasiloxane, trimethyl triphenyl cyclotrisiloxane, tetramethyl tetraphenyl cyclotetra siloxane, octaphenylcyclotetrasiloxane, and the like, and combinations thereof.

The weight ratio of the core to the shell in the (B) impact reinforcing agent may be about 2:8 to about 8:2, for example, about 3:7 to about 7:3. In the case that the weight ratio of the core to the shell is outside of the above ranges, the impact resistance may be degraded and also the exterior appearance of a molded product may be deteriorated.

The thermoplastic resin composition may include the (B) impact reinforcing agent in an amount of about 3 to about 15 parts by weight, for example, about 4 to about 12 parts by weight, based on about 100 parts by weight of the base resin. In some embodiments, the thermoplastic resin composition may include the (B) impact reinforcing agent in an amount of about 3, 4, 5, 6, 7, 8, 9, 10, 11, 12, 13, 14, or 15 parts by weight. Further, according to some embodiments of the present invention, the amount of the (B) impact reinforcing agent can be in a range from about any of the foregoing amounts to about any other of the foregoing amounts.

When the thermoplastic resin composition includes the (B) impact reinforcing agent in an amount outside of the above range, improvements in impact resistance may be insignificant, thereby causing cracks in a molded product during an injection-molding process.

In addition, an average particle size of the (B) impact reinforcing agent may be about 100 to about 400 nm, for example, about 120 to about 380 nm. Within the range as described above, degradation in impact resistance due to the filler (C) may be remarkably improved.

(C) Filler

The thermoplastic resin composition according to an exemplary embodiment of the present invention may include the (C) filler. The (C) filler may include talc particles having a plate-like shape, and in terms of balance between the exterior appearances and properties of the thermoplastic resin composition, using talc particles having an aspect ratio of 4 to 50 may be further effective, as compared to the case of using other filler materials.

The thermoplastic resin composition may include (C) filler in an amount of about 10 to about 40 parts by weight, for example, about 15 to about 35 parts by weight, based on about 100 parts by weight of the base resin. In some embodiments, the thermoplastic resin composition may include (C) filler in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 parts by weight. Further, according to some embodiments of the present invention, the amount of the (C) filler can be in a range from about any of the foregoing amounts to about any other of the foregoing amounts.

When the thermoplastic resin composition includes the (C) filler in an amount within the above range, effects in exterior appearances improvements may be significantly increased.

(D) Polyolefin Wax

In addition, the thermoplastic resin composition according to an exemplary embodiment of the present invention may further include a (D) polyolefin wax, and the (D) polyolefin wax may be a polyethylene wax.

By adding the (D) polyolefin wax to the thermoplastic resin composition, the occurrence of gases caused by local generation of heat according to an increase in viscosity of the thermoplastic resin composition through an interaction between the (A3) vinyl cyanide compound-aromatic vinyl compound copolymer and the (D) polyolefin wax may be significantly reduced.

The thermoplastic resin composition may include the (D) polyolefin wax in an amount of about 0.1 to about 1 part by weight, for example, about 0.2 to about 0.8 parts by weight, based on about 100 parts by weight of the base resin. In some embodiments, the thermoplastic resin composition may include the (D) polyolefin wax in an amount of about 0.1, 0.2, 0.3, 0.4, 0.5, 0.6, 0.7, 0.8, 0.9, or 1 part by weight. Further, according to some embodiments of the present invention, the amount of the (D) polyolefin wax can be in a range from about any of the foregoing amounts to about any other of the foregoing amounts.

When the thermoplastic resin composition includes the (D) polyolefin wax in an amount of less than 0.1 parts by weight, effects of suppressing the occurrence of gas silver may be insignificant, while when the thermoplastic resin composition includes the (D) polyolefin wax in an amount of greater than 1 part by weight, delamination may occur.

A molded product for an automobile exterior according to an exemplary embodiment of the present invention may have an Izod impact strength of about 7 to about 10 kgf·cm/cm measured by ASTM D256, a flexural modulus of about 40,000 kgf/cm$^2$ or more measured by ASTM D790 and a coefficient of thermal expansion ranging from about 40 to 45 μm/(m·° C.) measured by ASTM E831. Through several experiments, it could be confirmed that the thermoplastic resin composition could have an excellent exterior appearance and superior rigidity, when being injection-molded as a molded product for an automobile exterior.

EXAMPLES

Hereinafter, test results are provided to demonstrate excellent characteristics of a thermoplastic resin composition according to an exemplary embodiment of the present invention. Respective components described in the following Table 1 are mixed with each other in amounts set forth in Table 1, and then, are melt-extruded and processed to thereby form a pellet-shaped thermoplastic resin composition. A melt-extrusion process is undertaken using a twin screw extruder in which L/D=29 and a diameter thereof is 45 mm, and a barrel temperature is set to 250° C.

The following Table 1 sets forth Inventive Examples and Comparative Examples obtained by varying whether or not the respective components are present and content ratios thereof. In the Table, the respective contents of polycarbonate resin, a vinyl cyanide compound-aromatic vinyl compound copolymer and polyester resin, which are a base resin, are denoted by weight percent (wt %), and the respective contents of an impact reinforcing agent, a filler and a polyolefin wax are denoted by parts by weight with respect to 100 parts by weight of the base resin.

TABLE 1

| | | Inventive Example | | | | Comparative Example | | | | | | |
|---|---|---|---|---|---|---|---|---|---|---|---|---|
| | | 1 | 2 | 3 | 4 | 1 | 2 | 3 | 4 | 5 | 6 | 7 |
| Polycarbonate Resin | (A1) | 70 | 60 | 85 | 73 | 70 | 50 | 60 | 70 | 71 | 68 | 68 |
| Polyester Resin | (A2) | 25 | 34 | 12 | 25 | 25 | 42 | 34 | 30 | 24 | 27 | 22 |

TABLE 1-continued

|  |  | Inventive Example | | | | Comparative Example | | | | | | |
|---|---|---|---|---|---|---|---|---|---|---|---|---|
|  |  | 1 | 2 | 3 | 4 | 1 | 2 | 3 | 4 | 5 | 6 | 7 |
| Vinyl Cyanide Compound-Aromatic Vinyl Compound Copolymer | (A3-1) | 5 | 6 | 3 | 2 | 5 | 8 | 6 | — | 5 | — | 10 |
|  | (A3-2) | — | — | — | — | — | — | — | — | — | 5 | — |
| Impact Reinforcing Agent | (B1) | — | — | — | — | 8 | — | — | — | — | — | — |
|  | (B2) | — | — | — | 10 | — | — | 8 | — | 10 | — | — |
|  | (B3) | — | 12 | 4 | — | — | 8 | — | — | — | 7 | 9 |
|  | (B4) | 8 | — | — | — | — | — | — | 8 | — | — | — |
| Filler | (C1) | 29 | 34 | 20 | 25 | 29 | — | — | 29 | 25 | 27 | 28 |
|  | (C2) | — | — | — | — | — | 30 | — | — | — | — | — |
|  | (C3) | — | — | — | — | — | — | 10 | — | — | — | — |
| Polyolefin Wax | (D) | 0.5 | 0.2 | 0.3 | 0.7 | — | — | — | — | 2 | 0.4 | 0.5 |

The respective components described in Table 1 will be explained as follows.

The (A1) polycarbonate resin is a product available from Samsung SDI Co., Ltd and having a weight-average molecular weight of 24,000 g/mol.

The (A2) polyester resin is a product available from SK Chemicals under the trade name BL-8050 and having an intrinsic viscosity of 0.77 dl/g.

The (A3-1) vinyl cyanide compound-aromatic vinyl compound copolymer is a product available from Samsung SDI Co., Ltd, having a weight-average molecular weight of 120,000 g/mol, and containing a vinyl cyanide compound in an amount of 24 wt %.

The (A3-2) vinyl cyanide compound-aromatic vinyl compound copolymer is a product available from Samsung SDI Co., Ltd, having a weight-average molecular weight of 116,000 g/mol, and containing a vinyl cyanide compound in an amount of 40 wt %.

The (B1) impact reinforcing agent is a product available from DuPont under the trade name Elvaloy AC1330, an ethylene-methyl acrylate copolymer resin.

The (B2) impact reinforcing agent is a product available from Mitsubishi Rayon Co., Ltd. under the trade name of Metablen C223A, having a core-shell structure and an average particle size of 350 nm.

The (B3) impact reinforcing agent is a product available from Dow Chemical Co. under the trade name of Paraloid EXL-2603, having a core-shell structure and an average particle size of 250 nm.

The (B4) impact reinforcing agent is a product available from Dow Chemical Co. under the trade name of Paraloid BTA-731, having a core-shell structure and an average particle size of 130 nm.

The (C1) filler is a product available from Hayashi Kasei under the trade name UPN HS-T 0.5, containing talc particles, and having an aspect ratio of 30.

The (C2) filler is a product available from Solvay Chemicals Inc. under the trade name Blanc Fixe Brilliant, containing barium sulfate ($BaSO_4$), and having an aspect ratio of 1.

The (C3) filler is a product available from KCC Corp. under the trade name CS321-EC10-3, containing glass fiber, and having a needle-like shape and an aspect ratio of 150.

The (D) polyolefin wax is a product available from Mitsui Chemicals Inc. under the trade name Hi-Wax 400P, a polyolefin wax.

After pellets prepared according to Table 1 are dried at a temperature of 100° C. for 2 hours, specimens for measuring physical properties thereof and specimens having dimensions of 9 cm ×5 cm ×0.2 cm are manufactured by setting a cylinder temperature of 240° C. and a mold temperature of 60° C., using a 6 oz. injection molding machine. The physical properties of the manufactured specimens are measured using the following methods, and results thereof are indicated in the following Table 2.

(1) Measurement of IZOD impact strength: Notched Izod impact strength is measured by ASTM D256 (specimen thickness: ⅛", measurement temperature: 23° C.)

(2) Measurement of flexural modulus: Flexural modulus is measured by ASTM D790. (specimen thickness: ¼")

(3) Measurement of dimensional stability: The coefficient of thermal expansion (CTE) in a flow direction is measured by ASTM E831. (Measurement temperature range: −20 to 100° C.)

(4) Measurement of the exterior appearance of injection-molded product: Whether or not a filler material protruded outwardly and gas silver occurred is evaluated macroscopically in the exterior appearance of a circumferential portion of an injection gate of an injection-molded product, and roughness (Ra) in a surface of the molded product is measured at a magnification of 6 times using an optical profiler NT2000 available from Veeco Instruments Inc.

Results obtained by measuring the physical properties of the thermoplastic resin composition manufactured according to Table 1 are as follows.

TABLE 2

|  | Inventive Example | | | | Comparative Example | | | | | | |
|---|---|---|---|---|---|---|---|---|---|---|---|
|  | 1 | 2 | 3 | 4 | 1 | 2 | 3 | 4 | 5 | 6 | 7 |
| IZOD Impact strength (kgf · cm/cm) | 7 | 8 | 8 | 8 | 5 | 10 | 6 | 7 | 8 | 5 | 4 |
| Flexural Modulus (kgf/cm$^2$) | 42200 | 41500 | 42600 | 43600 | 43200 | 25000 | 43560 | 41030 | 42600 | 41500 | 36010 |

TABLE 2-continued

| | | Inventive Example | | | | Comparative Example | | | | | | |
|---|---|---|---|---|---|---|---|---|---|---|---|---|
| | | 1 | 2 | 3 | 4 | 1 | 2 | 3 | 4 | 5 | 6 | 7 |
| | Coefficient of Thermal Expansion (CTE) (μm/(m · °C.)) | 40 | 45 | 42 | 41 | 40 | 68 | 38 | 43 | 42 | 42 | 39 |
| Exterior appearance of Injection-Molded Product | Macroscopic Evaluation | OK | OK | OK | OK | Delamination | OK | Filler protrusion | Gas Silver | Delamination | OK | OK |
| | Ra (μm) | 183 | 182 | 185 | 183 | 184 | 148 | 230 | 195 | 178 | 191 | 183 |

As shown in Table 2, in Comparative Example 1 using the (B1) impact reinforcing agent without a core-shell structure and containing no rubber polymer unlike the present invention, impact strength is remarkably deteriorated as compared to the inventive examples according to the present invention and further, a delamination phenomenon occurs in the injection-molded product.

In addition, in Comparative Example 2 using the filler (C2) containing barium sulfate (BaSO$_4$), instead of the filler (C1) containing talc particles, a value of flexural modulus is remarkably degraded while the coefficient of thermal expansion is relatively high to thereby result in a low degree of dimensional stability. In Comparative Example 3 using the filler (C3) containing glass fiber, a degree of impact strength is low, the protrusion of glass fiber to the surface of the injection-molded product is observed, and an uneven surface is caused.

Further, in Comparative Example 4 in which the (A3) vinyl cyanide compound-aromatic vinyl compound copolymer is not used, gas silver is generated in the surface of the injection-molded product and surface characteristics are not good. In Comparative Example 5 using a greater amount of the (D) polyolefin wax than the range according to the present invention, a delamination phenomenon occurs in the injection-molded product.

Furthermore, in Comparative Example 6 using the (A3) vinyl cyanide compound-aromatic vinyl compound copolymer including the vinyl cyanide compound in a greater amount than the range according to the present invention, a degree of impact strength is significantly reduced, and in Comparative Example 7 using the (A3) vinyl cyanide compound-aromatic vinyl compound copolymer in an amount greater than the range according to the present invention, a degree of impact strength is significantly reduced.

That is, in Comparative Examples 1 to 7, at least one of physical properties such as impact strength, flexural modulus, dimensional stability and the like, and/or the exterior appearance of the injection-molded product is not good and accordingly, Comparative Examples 1 to 7 are inappropriate for use in automobile exterior materials such as spoilers or the like.

Meanwhile, Examples 1 to 4 according to the present invention exhibit high degrees of impact strength, flexural modulus, and dimensional stability and the exterior appearance of the injection-molded product is excellent.

Thus, through the experiments, threshold meanings of content ratios between components according to the present invention and superior characteristics of the thermoplastic resin composition according to the present invention could be proved.

According to exemplary embodiments, a thermoplastic resin composition that can have high degrees of rigidity and dimensional stability while allowing for an excellent exterior appearance of an injection-molded product may be provided.

Effects obtainable from exemplary embodiments of the present invention are not limited to those described as above, and other effects not described herein could be obviously understood by a person having ordinary skill in the art from the description of claims.

While this invention has been described in connection with what is presently considered to be practical embodiments, it is to be understood that the invention is not limited to the disclosed exemplary embodiments, but, on the contrary, is intended to cover various modifications and equivalent arrangements included within the spirit and scope of the appended claims. Therefore, the aforementioned exemplary embodiments should be understood to be exemplary but not limiting the present invention in any way.

What is claimed is:

1. A thermoplastic resin composition comprising:
   (A) a base resin including (A1) about 60 to about 85 wt % of polycarbonate resin, (A2) about 10 to about 35 wt % of polyester resin, and (A3) about 2 to about 6 wt % of a vinyl cyanide compound-aromatic vinyl compound copolymer;
   (B) an impact reinforcing agent;
   (C) a filler; and
   (D) a polyolefin wax in an amount of about 0.1 to about 1 part by weight based on about 100 parts by weight of the base resin,
   wherein the (B) impact reinforcing agent has a core-shell structure including a rubbery polymer comprising a diene rubber, an acrylic rubber, a silicone rubber, or a combination thereof, and
   wherein a molded product formed of the composition has an Izod impact strength of about 7 to about 10 kgf·cm/cm measured by ASTM D256, a flexural modulus of about 40,000 kgf/cm$^2$ or more measured by ASTM D790 and a coefficient of thermal expansion ranging from about 40 to 45 μm/(m·° C.) measured by ASTM E831.

2. The thermoplastic resin composition according to claim 1, wherein the (D) polyolefin wax is a polyethylene wax.

3. The thermoplastic resin composition according to claim 1, wherein the (A3) vinyl cyanide compound-aromatic vinyl compound copolymer is prepared by copolymerization from a mixture including about 1 to about 30 wt % of a vinyl cyanide compound.

4. The thermoplastic resin composition according to claim 1, comprising the (B) impact reinforcing agent in an amount of about 3 to about 15 parts by weight with respect to about 100 parts by weight of the base resin.

5. The thermoplastic resin composition according to claim 1, wherein an average particle size of the (B) impact reinforcing agent is about 100 to about 400 nm.

6. The thermoplastic resin composition according to claim 1, wherein the core of the (B) impact reinforcing agent includes a rubbery polymer comprising a diene rubber, an acrylic rubber, a silicone rubber, or a combination thereof, and the shell of the (B) impact reinforcing agent includes styrene, alkyl-substituted styrene, (meth) acrylonitrile, (meth) acrylate, alkyl (meth) acrylate, or a combination thereof as a monomer which is capable of being graft-copolymerized onto the rubbery polymer, wherein the alkyl refers to C1 to C10 alkyl.

7. The thermoplastic resin composition according to claim 1, wherein a weight ratio of the core to the shell in the (B) impact reinforcing agent is about 2: 8 to about 8:2.

8. The thermoplastic resin composition according to claim 1, wherein the (A2) polyester resin is a polyethylene terephthalate resin.

9. The thermoplastic resin composition according to claim 1, wherein a molded product formed of the composition has a surface roughness Ra of 182 to 185 μm.

10. The thermoplastic resin composition according to claim 1, comprising the (C) filler in an amount of about 10 to about 40 parts by weight with respect to about 100 parts by weight of the base resin.

11. The thermoplastic resin composition according to claim 10, wherein the (C) filler includes talc particles.

12. The thermoplastic resin composition according to claim 11, wherein the talc particles have a plate-like shape and an aspect ratio of about 4 to about 50.

13. A molded part for an automobile exterior comprising: the thermoplastic resin composition according to claim 1.

14. A thermoplastic resin composition comprising:
(A) a base resin including (A1) about 60 to about 85 wt % of polycarbonate resin, (A2) about 10 to about 35 wt % of polyester resin, and (A3) about 2 to about 6 wt % of a vinyl cyanide compound-aromatic vinyl compound copolymer;
(B) an impact reinforcing agent in an amount of about 3 to about 15 parts by weight based on about 100 parts by weight of the base resin, wherein the impact reinforcing agent has a core-shell structure including a rubbery polymer comprising a diene rubber, an acrylic rubber, a silicone rubber, or a combination thereof;
(C) a filler in an amount of about 10 to about 40 parts by weight based on about 100 parts by weight of the base resin, wherein the filler includes talc particles; and
(D) a polyolefin wax in an amount of about 0.1 to about 1 part by weight based on about 100 parts by weight of the base resin,
wherein a molded product formed thereof has an Izod impact strength of about 7 to about 10 kgf·cm/cm measured by ASTM D256, a flexural modulus of about 40,000 kgf/cm$^2$ or more measured by ASTM D790 and a coefficient of thermal expansion ranging from about 40 to 45 μm/(m·° C.) measured by ASTM E831.

15. The thermoplastic resin composition according to claim 14, wherein a molded product formed of the composition has a surface roughness Ra of 182 to 185 μm.

16. The thermoplastic resin composition according to claim 14, wherein the impact reinforcing agent has a core-shell structure including a compound comprising styrene, C1-C10 alkyl-substituted styrene, (meth)acrylonitrile, C1-C10 alkyl (meth)acrylate, or a combination thereof graft-copolymerized onto a rubbery polymer comprising a diene rubber, an acrylic rubber, a silicone rubber, or a combination thereof and wherein the talc particles have a plate-like shape and an aspect ratio of about 4 to about 50.

* * * * *